March 5, 1968

J. J. MULLANEY III 3,371,676

LUBRICATED PLUG VALVE WITH ADJUSTABLE UNIFORM
SEALING PRESSURE GLAND

Filed June 18, 1965

INVENTOR.
JOHN J. MULLANEY III
BY
*David D. McKenney*
ATTORNEY

INVENTOR.
JOHN J. MULLANEY III
BY
ATTORNEY

INVENTOR.
JOHN J. MULLANEY III
BY
ATTORNEY

INVENTOR.
JOHN J. MULLANEY III

BY

ATTORNEY

INVENTOR.
JOHN J. MULLANEY III
BY
ATTORNEY

United States Patent Office 3,371,676
Patented Mar. 5, 1968

3,371,676
LUBRICATED PLUG VALVE WITH ADJUSTABLE UNIFORM SEALING PRESSURE GLAND
John J. Mullaney III, Warwick, R.I., assignor to Grinnell Corporation, Providence, R.I., a corporation of Delaware
Filed June 18, 1965, Ser No. 465,065
25 Claims. (Cl. 137—246.19)

ABSTRACT OF THE DISCLOSURE

A lubricated plug valve construction having a tapered plug with the stem extending from the large end thereof through an aperture in the cover, with a flexible sealing member secured between the cover and body and overlying the large end of the plug around the stem and with a gland around the stem exerting sealing pressure on the sealing member, in which construction the gland includes a ball joint arrangement for maintaining adjustable uniform sealing pressure against sealing member even when the gland is tilted.

---

In valves of the kind to which this invention relates it has been the usual practice to properly position the plug in the body and to seal the stem by a gland adjustable with respect to the plug by a series of bolts threaded into the cover in spaced relation around the stem. The inner end of this gland has customarily extended to a point adjacent the plug and has limited axial movement of the plug by backing up a sealing device disposed across the plug surface.

The difficulty has been that prior to my invention adjustment of these bolts has been unusually critical. Assume for example that there are two such bolts. Tightening of only one tilts the gland and moves that side of its inner end toward the plug, thereby decreasing the range of positions which the plug can assume in the body cavity even though the other bolt is not correspondingly tightened. However such tightening of one bolt also tends to decrease the back-up force exerted by the gland on the sealing device adjacent the other bolt. As a result leakage is likely to occur along the stem adjacent this other bolt, and any subsequent tightening of it (to prevent such leakage) could cause its side of the gland to tilt the other way and impose a new limit on the plug position which, in turn, could cause leakage adjacent the first mentioned bolt and which might hold the plug too deeply in the cavity and make it too difficult to turn. It is the unusual case for a workman to be able to tighten a plurality of bolts so that they share exactly equally in limiting the plug position and so that the gland backs up the sealing device with the same force at all points when line pressure tends to lift the plug. Consequently many valves of this type are compelled to employ sealing devices having relatively thick layers of compressible sealing material to take up the expected nonuniformity in bolt tightening. This has not been a wholly satisfactory solution, however, because the properties which enable the sealing material to compensate for such the uneven bolt adjustment cause it to require frequent tightening and replacement.

In all lubricated plug valves having tapered plugs some provision must be made for jacking the plug off its seat to free it in the event it becomes stuck. This is usually accomplished by utilizing the hydraulic pressure of the lubricant to lift the plug slightly off its seat. In the process of lifting, the clearance between the tapered surfaces of the plug and body cavity are increased sufficiently to relieve any excess lubricant pressure that would otherwise build up. The thick layers of sealing material in the prior art valves have helped in this respect, but they cannot be relied upon for such pressure relief because they lose their resiliency in use. Accordingly it has been the practice to interpose conventional springs somewhere between the cover and the plug or to so design the cover, gland and bolts that they provide sufficient resiliency themselves. Ideally, the total resiliency should not impose any spring loading on the plug when the latter is at or below its desired position, and the overall spring rate should be high enough so that when line pressure tends to push the plug out of the cavity the latter cannot rise significantly above its desired position.

The present invention overcomes the adjustment difficulty described by a mounting arrangement for the gland member back-up surface (and the intervening sealing device backed up thereby) which is in the nature of a ball joint. As a result the sealing device arrests plug movement with a force which is substantially uniform around the stem, and thereby produces a complete seal, when the bolts are unequally positioned.

As a result of this invention, the amount of turning of each gland bolt is not critical as far as the attainment of a stem seal is concerned, and hence proper plug positioning in the body cavity can be achieved easily by the adjustment of less than all the bolts and without upsetting the seal around the stem. Where some kind of threaded gland is used instead of a plurality of bolts, as will be understood, there is a slightly different beneficial result of this invention, namely a compensation for the inevitable errors which machining tolerances permit.

In one typical valve embodying the present invention the improved gland assembly includes a multi-bolt gland (the most popular form), but with an inner annular surface following the plane of an imaginary cone. It further includes a separate ring which is located between this gland surface and the sealing device and which has an outer surface following the plane of an imaginary sphere. The two surfaces fit together in the nature of a ball joint. The opposite inner ring surface is presented toward and matches the adjacent outer surface of an annular sealing device which, in turn, has its opposite inner surface presented to the larger plug end. As would be expected, the opposite surfaces of this sealing device are parallel, but it is an unexpected advantage of the present invention that the thickness of the sealing device between its surfaces can be relatively small and the materials of the sealing device can be relatively rigid.

In this typical embodiment being described the bolts pass loosely through apertures in a gland flange, are threaded into the cover in spaced apart relation about the stem and have belleville springs located between their heads and this flange. In these locations the springs are readily visible so that a broken spring can be quickly detected and replaced, and in addition the springs are not so likely to come in contact with the fluid in the valve. The sealing device is the inner portion of an annular gasket and diaphragm assembly which overlies the larger plug end and the peripheral portion of which acts as a gasket seal between the cover and the body. Line pressure in the valve urges the plug toward the cover and presses the surface of the larger plug end against this inner sealing device which is backed up by the ring which, in turn, is backed up by the gland which is resiliently held by the bolt-supported belleville springs.

The center of the imaginary sphere and the apex of the cone are preferably located so that the spehical and conical surfaces have substantial slopes with respect to the plug's rotational axis where they engage, and so that this slope is substantially uniform around the stem. As a result tipping the gland with respect to the plug by threading one bolt into the cover more than the others causes a lateral component of force to appear between the gland and ring when the plug is urged upward by the line pressure. This lateral component tends to move the gland and ring laterally with respect to each other and to maintain the conical and spherical surfaces in continuous contact around the stem without changing the orientation of the ring to the plug. Clearances are provided between the stem and the ring and the stem and the gland, on the one hand, and between the cover and ring and the cover and the gland, on the other hand, so that this lateral relative movement can take place. Preferably the first-mentioned clearances are greater than the last-mentioned clearances so that the ring and gland cannot rub against the stem.

In another typical embodiment to the cover, gland members and bolts are designed to have the required resiliency and separate springs are not necessary.

Accordingly, it is one object of the present invention to provide a tapered lubricated plug valve having an improved arrangement for automatically adjusting the gland assembly in accordance with the orientatioon of the plug end surface, whereby a leak-tight primary seal is maintained all the way around the stem.

Another object is to provide a tapered lubricated plug valve of the kind described wherein said adjusting arrangement maintains a gland sealing surface substantially parallel to the plug end surface.

Another object is to provide a tapered lubricated plug valve of the kind described wherein the gland assembly surrounds the stem and is held with respect to the cover by a plurality of bolt-like members.

Another object is to provide a tapered lubricated plug valve of the kind described wherein a spring is interposed between each bolt-like member and the gland assembly.

Another object is to provide a tapered lubricated plug valve of the kind described wherein said arrangement employs a gland and a ring having surfaces which engage each other and wherein at least one of these surfaces is sloped with respect to the axis of stem rotation to provide a tendency toward lateral movement between the gland and ring when the bolt-like members are unequally made up.

Another object is to provide a tapered lubricated plug valve of the kind described in which the sloped mating surface is a portion of a sphere.

Another object is to provide a tapered lubricated plug valve of the kind described in which the sphere has its center on the stem axis.

Another object is to provide a tapered lubricated plug valve of the kind described in which one of the engaging gland and ring surfaces is a portion of a sphere and the other is a portion of a cone.

Another object is to provide a tapered lubricated plug valve of the kind described wherein said springs engage a surface on the gland, and wherein the center of said sphere is so located with respect to this surface that there is substantially no tendency toward lateral movement between the springs and this surface when the gland rotates about said center.

Another object is to provide a tapered lubricated plug valve having a gland which is in adjustable threaded engagement with the cover and which has a surface presented toward the plug, having a ring with a surface engaging said gland surface, and having at least one of said surfaces forming a portion of an imaginary sphere.

Another object is to provide a tapered lubricated plug valve which is inexpensive to manufacture, gives excellent performance and is easy to maintain in service.

Other objects will appear hereinafter.

The best modes which I have contemplated for applying the principles of the present invention are shown in accompanying drawings, but these are to be deemed primarily illustrative for it is intended to cover by suitable expression in the appended claims whatever of patentable novelty exists in the invention disclosed.

Figure 1:
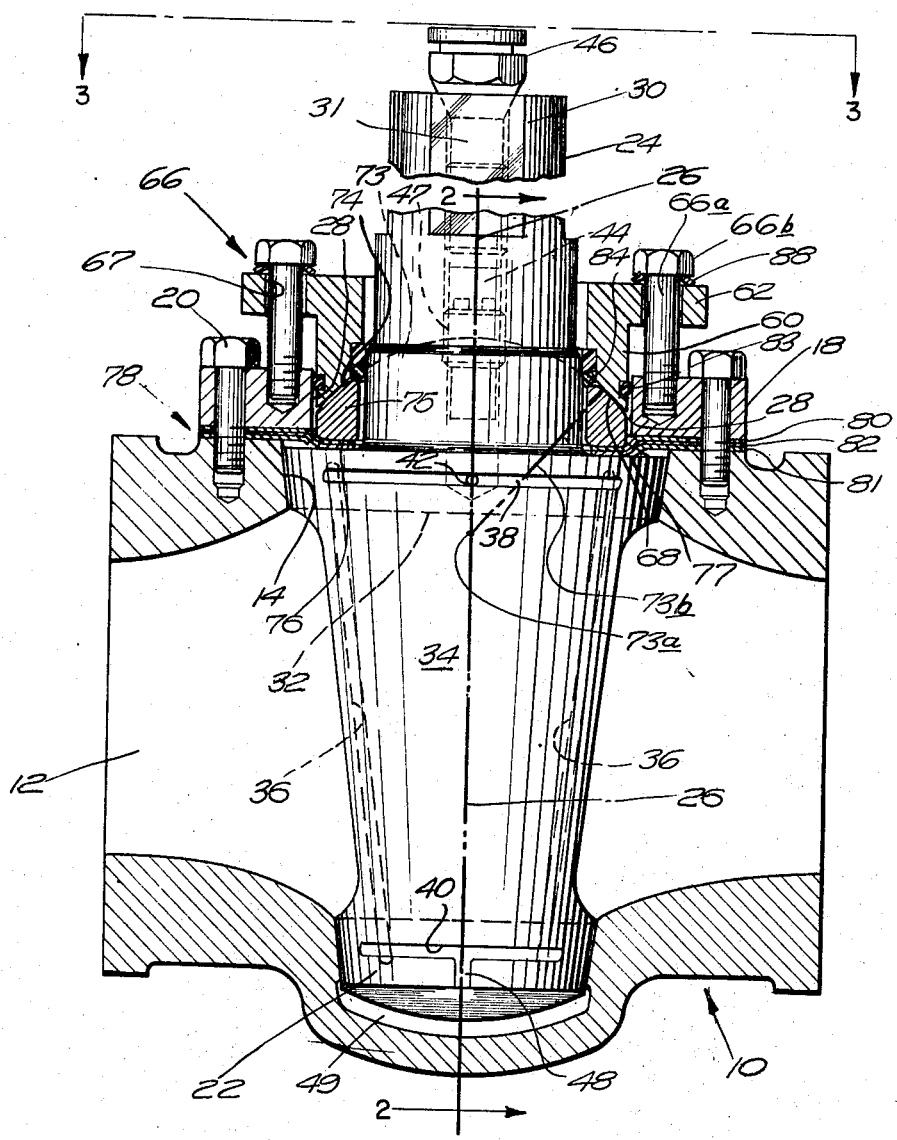
FIGURE 1 is a cross-sectioned side elevation view of a tapered lubricated plug valve according to the present invention.

Referring now more particularly to the drawings, the valve shown has a body 10 with a flow passage 12 therethrough and a tapered cavity 14 intersecting the flow passage at right angles. The larger end of the tapered cavity (upper end in FIG. 1) extends completely through the side of the body and is provided with a cover 18 secured to the body by bolts 20. A plug 22, tapered to correspond to the taper of the cavity, is fitted therein and carries an integral stem 24 aligned with the axis 26 of the body cavity and projecting through a large central opening 28 in the cover. A suitable handle (not shown), adapted to fit over the stem end 30 and to engage the flats 31 thereon, enables an operator to rotate the plug about axis 26 to open and close the valve.

The plug has a passage 32 therethrough which in the rotative position of FIG. 1 registers with the flow passage 12 to open the valve and which, in a rotative position 90° removed from that shown in FIG. 1, is out of such registration to close the valve. This latter position results in the plug wall area 34 being presented across, and blocking, the flow passage 12, and to make this blocking fluid tight the wall area 34 is completely surrounded by thin films of lubricant defined by the small spaces between the plug and cavity surfaces. These spaces are filled with lubricant from a network of grooves 36–38–40 which are located in the cavity and plug tapered wall surfaces and which are pressurized from time to time. More particularly, there are generally vertical grooves 36 in the cavity wall surfaces on either side of the flow passage and generally horizontal grooves 38 and 40 in the plug wall surfaces above and below the area 34. When the plug is rotated to the closed position the ends of these grooves overlap each other so that the lubricant supplied to upper grooves 38 through plug ducts 42 fills all the grooves and is in position to maintain the thin films encircling the plug areas 34.

The ducts 42 lead from a lubricant supply chamber 44 which is located in the plug stem 24 and which is kept filled with a quantity of lubricant. A ram 46, threaded into the end of the stem, can be advanced into the chamber to pump lubricant through a check valve 47, into the ducts 42, into the grooves 36–38–40 and out of these grooves and into the small spaces previously described.

The lower plug grooves 40 connect through a special passage 48 to a region 49 in the cavity below the small end of the plug. Advancing the ram, as described, sufficiently increases the lubricant pressure in the region 49 to actually lift the plug upward against the forces holding it down. The amount of this lift is small because of the resistance of the plug holding apparatus, and because even a small amount of lift so increases the spaces between the plug and cavity surfaces that the lubricant can readily escape therethrough into the flow passage of the controlled fluid. This escape prevents the lubricant pressure from becoming excessive.

Because of the relative motion between the plug stem 24 and the cover 18 during valve operation some controlled fluid will eventually find its way upward through the lubricant filled spaces between the plug and the cavity surfaces, and thence toward the stem across the flat annular surface of the large end of the plug. Because of the relative rotative motion between the plug stem 24 and cover 18 during valve operation some form of sealing gland is necessary in this region to prevent this fluid from leaking to the exterior of the valve.

In the embodiment of FIGS. 1–6 the outer portion of this sealing gland comprises a cylindrical member 60 which fits loosely around the stem and which has a peripheral flange 62 located at its outer end. This flange is fastened to the cover by bolts 66 which have the usual shaft portions 66a fitted loosely through flange apertures 67 and threaded into the cover and which have the usual head portions 66b too large to pass through these apertures. An annular surface 68 is formed on the inner end of the cylindrical member 60 coinciding with an imaginary cone 70 having an apex 71 which is so located (on the stem axis 26 in the positions of the parts shown in FIGS. 1–4) that the surface 68 slopes substantially with respect to this axis. This conical gland surface 68 fits against an outwardly present annular surface 74 formed on the outer end of a second gland member 75 which is in the form of a ring and which is located loosely in the space between the stem and cover opening. This ring surface 74 coincides with an imaginary sphere 73 which has a center 73a and radius 73b and which is so located on the stem axis that the surface 74 also slopes substantially with respect to this axis. The opposite inwardly-presented ring surface 76 is flattened to correspond to the flat surface 77 of the larger end of the plug and constitutes the inner portion of the sealing gland.

The actual sealing device is an annular diaphragm-gasket assembly 78 having its outer periphery clamped between the cover and body surfaces which surround the body cavity and having its remainder extending inwardly over the plug surface 77 toward the stem 24. The assembly preferably comprises a pair of compressed asbestos composition gaskets 80 and 81 with a flexible stainless steel diaphragm 82 between them, but it will be understood that other shapes and materials will do, the best being those which have good thrust bearing qualities, inertness in the presence of the lubricant and controlled fluids and relatively low cold flow. Gasket 81 extends inwardly only about as far as the cover opening 28. Gasket 80 and diaphragm 82 extend all the way to the stem and therefore lie between the plug and ring surfaces 76 and 77.

The plug is normally unbalanced by a force substantially equal to the line pressure multiplied by the stem seal area. This force presses the plug upward against the diaphragm 82 (which is backed up by gasket 80, gland members 75 and 60, springs 88 and bolts 66) to achieve a primary seal between plug surface 77 and diaphragm 82 over a narrow annular area encircling the stem.

For secondary sealing O-ring seals 83 and 84 are located between the cylindrical side walls of gland member 60, the cover opening and the stem, respectively, the grooves being formed in the member 60. This secondary seal blocks the escape of any controlled fluid which may get through the primary seal described above.

Because of the slope of the conical and spherical surfaces with respect to the axis the plug movement along this axis during adjustment is only a fraction of the amount of the bolt advance which causes this movement. This mechanical disadvantage provides a fine degree of control in plug positioning.

Figure 4:
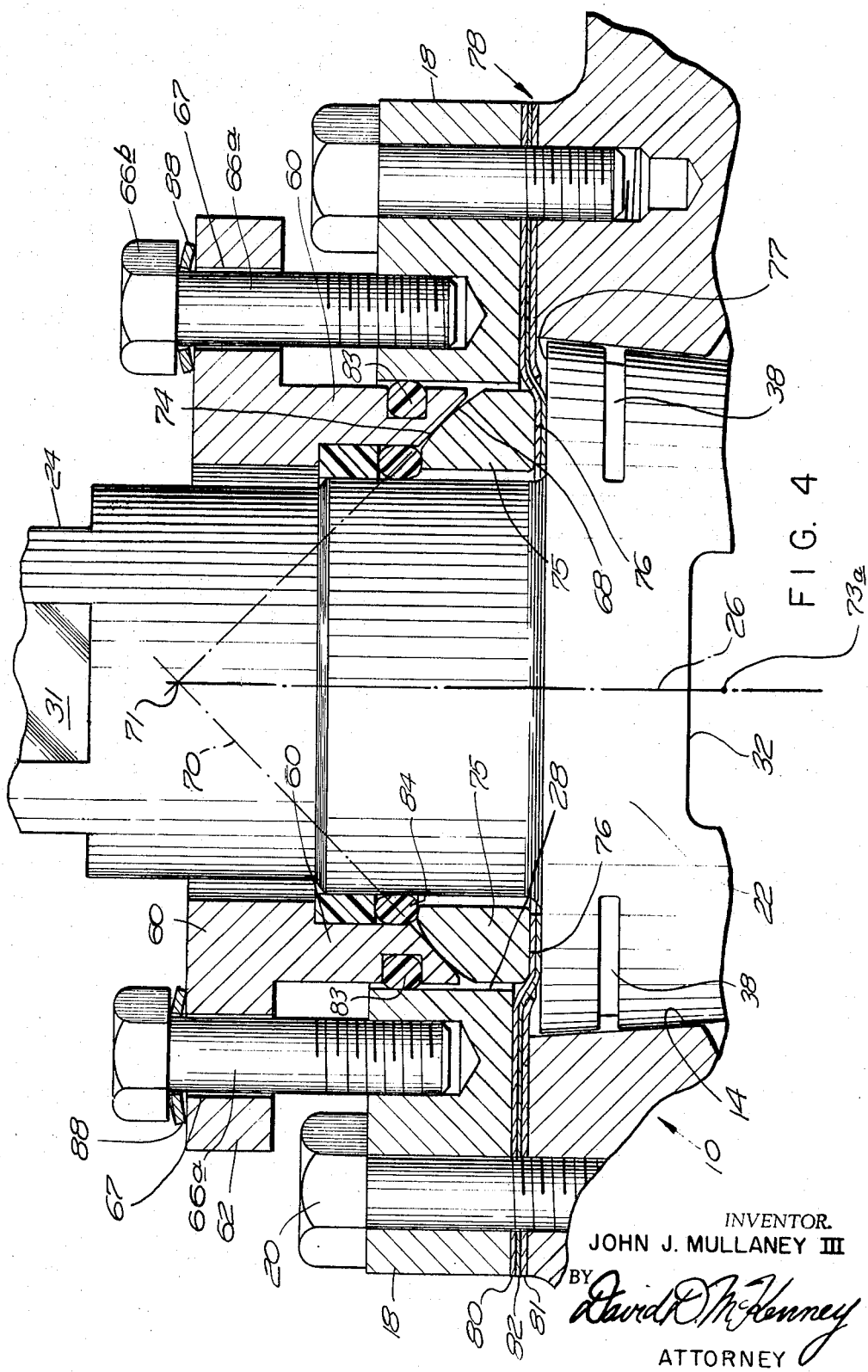
FIGURE 4 is an enlarged cross-sectioned fragmentary view of the arrangement of FIGS. 1–3 with the bolts made up equally and assuming the parts are all machined without any errors due to tolerances.
Figure 5:
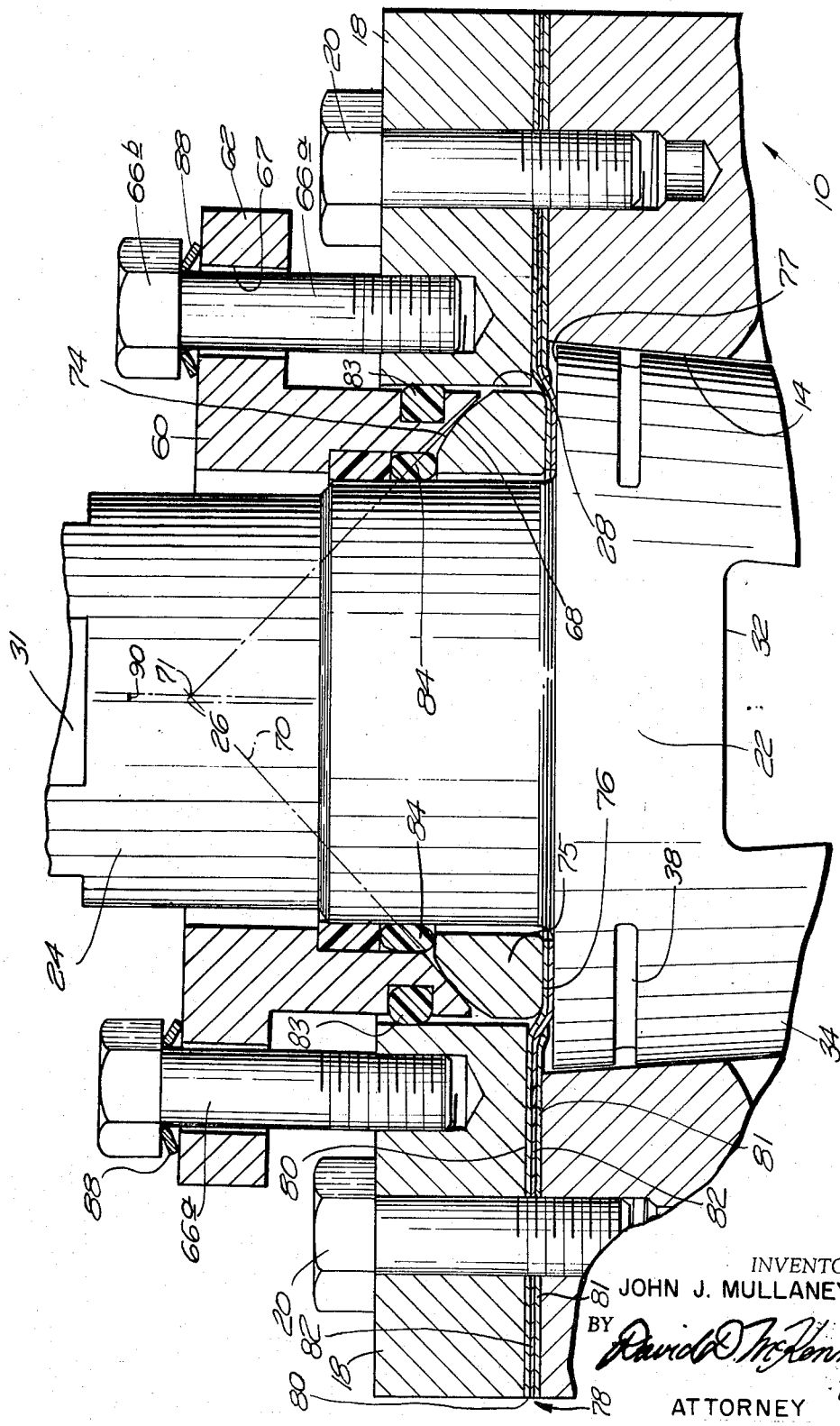
FIGURE 5 is another view of the FIG. 4 parts but showing their positions when the right hand bolt has been additionally threaded into the cover.
Figure 6:
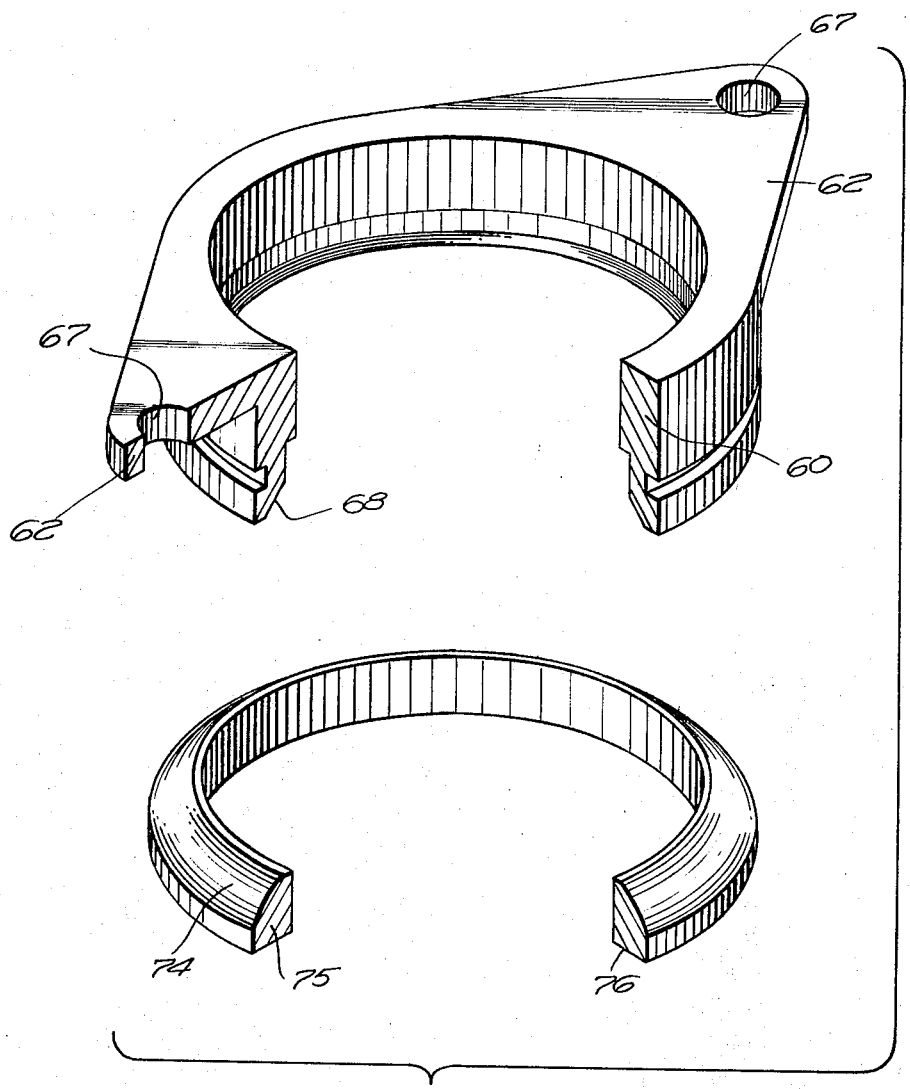
FIGURE 6 is a partly sectioned, exploded perspective view of the gland of the embodiment of FIGS. 1–5.

The features above-described are particularly well illustrated in the enlarged views of FIGS. 4 and 5. In FIG. 4 the gland members 60 and 75 are shown exactly concentric with respect to the axis 26 and with the bolts 66 exactly equally tightening so that the axes of the gland members coincide with the plug stem axis 26. It is assumed that the various parts have been so machined that the surfaces 76 and 77 are exactly parallel in FIG. 4. It is further assumed that the gasket 80 and diaphragm 82 are of uniform thickness throughout. If the plug position in FIG. 4 provides the proper thickness of the lubricant film, then the valve is ready for service, and the arrangement is reminiscent of the prior art wherein a uniform sealing around the stem requires that the inner surface of the bolted gland be as parallel as possible to the outer surface of the sealing device which it engages. However, as previously mentioned, it has always been quite a feat to achieve this parallel relationship in the prior art at just that one amount of gland adjustment which provides the proper lubricant film thickness. When the gland and plug surfaces are parallel in the prior art the plug is usually not in the right position, or, when the plug is in the right position the gland and plug surfaces are usually not parallel.

Thus, assume that in FIG. 4 the plug is not deep enough in the cavity, the lubricant films are too thick, and further adjustment of the gland is required to achieve the proper plug position. FIG. 5 shows what happens when the FIG. 4 position of the gland has been changed by threading only the right hand bolt farther into the cover. (It is assumed that only gland member 60 has moved with this tightening, tilting by angle 90 about sphere center 73a, and that gland member 75 has not moved laterally.) The tilting of gland 60 automatically moves the ring 75 downwardly, holding the plug deeper in the cavity, but the forces exerted between the spherical surfaces remain uniform around the stem, and the lower ring surface 76 remains parallel to the plug surface 77. Consequently the diaphragm-gasket sealing assembly is backed up with a force which is substantially uniform around the stem, and there is little likelihood of leakage.

The tilting illustrated in FIG. 5 requires a significant lateral component of movement of the gland member 60 with respect to the bolts 66 and the cover. Friction between the springs 88 and gland member 60 and between the springs and the bolt heads 66b would tend to resist this lateral component and may, in fact, exceed the corresponding frictional resistance between the ring surface 76 and the gasket 80. In that case the ring 75 would shift laterally to the left when the right-hand bolt is tightening, and the gland member 60 would merely tip about some axis which does not pass through sphere center 73a In either case the effect is the same, namely a maintaining of the gland member surface 76 substantially parallel to the sealing asembly surface which it engages (and hence to the plug surface 77) for any reasonable positioning of the bolts and a maintaining of the intersurface forces substantially uniform around the stem.

Figure 7:
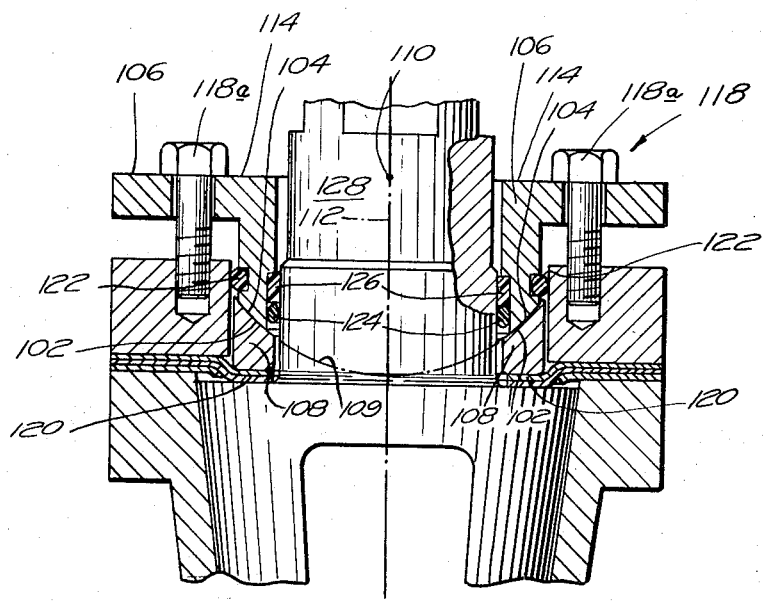
FIGURE 7 is a fragmentary cross-sectioned side elevation view of another embodiment of the invention.

FIGURE 7 shows another embodiment in which no separate springs are employed, the resiliency of the gland assembly being relied upon to relieve high lubricant pressures. Also in FIG. 7 the engaging surfaces 102 and 104, on gland members 106 and 108 both lie in an imaginary spherical plane 109 having its center 110 on the plug axis 112 at about the level of the outer surface 114 of the gland member 106. The advantage of this arrangement is that even though there is lateral movement of one or both of these spherical surfaces with respect to the cover, there is practically no lateral component of movement of gland member 106 at the level of the surface 114. Hence there wil be no slipping of the bolt heads 118a on the gland surface 114 during the adjustments of the gland bolts 118, and there is less tendency for the gland member 108 to move laterally relative to the gasket 120. The friction between the spherical surfaces 102 and 104 and the compression of the secondary sealing rings 122, 124 and 126 are about the only factors resisting the lateral movement in its attempt to obtain completely uniform primary sealing pressure around the stem.

Figure 8:
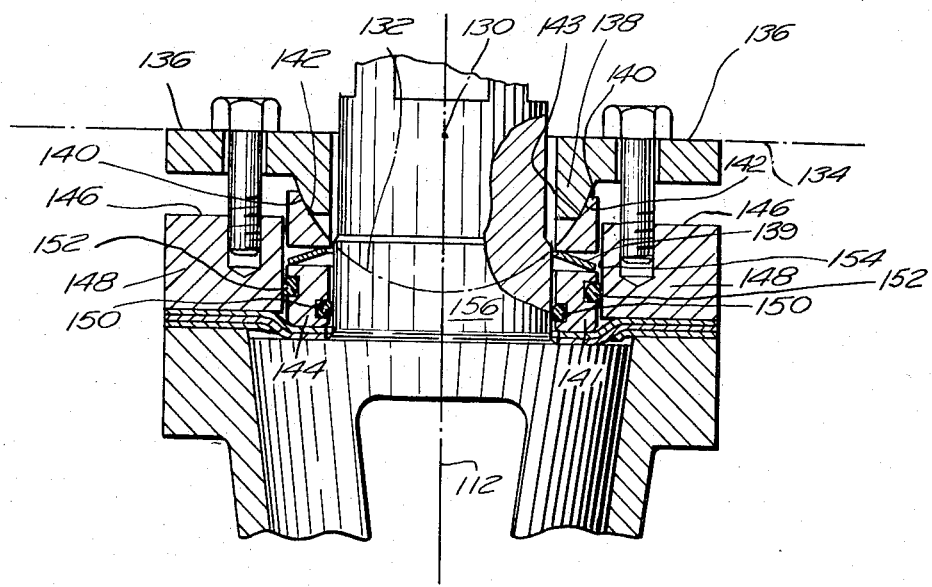
FIGURE 8 is a view like FIG. 7 but showing another embodiment.

FIGURE 8 is an embodiment which is similar to that of FIG. 7, in that there are no springs under the bolts heads and the center 130 of the spherical plane 132 is in the vicinity of the plane 134 of the outwardly presented surface 136 of the gland member 138. In this arrangement, however, a separate spring 139 is employed, namely a single large belleville spring located between gland members 140 and 141. The engaging spherical surfaces 142 and 143 are located in this embodiment on gland members 138 and 140, respectively, and are so close to the outer cover surface 146 (actually above it) that the secondary O-ring seals 150 and 152 between the cover opening and stem 154 and 156, respectively, cannot be located in the member 140. They are located instead in member 141 so that spring 139 will be above the secondary sealing which they provide. Here again, the gland members 140 and 141 do not need to move laterally to achieve the desirable relative movement between the spherical surfaces, with the result that no specially large clearances are needed between the gland members 140 and 141 and the stem and cover opening. Accordingly the spaces between these parts are shown relatively small in this embodiment. This is beneficial to the performance of the O-ring secondary seals.

Figure 9:
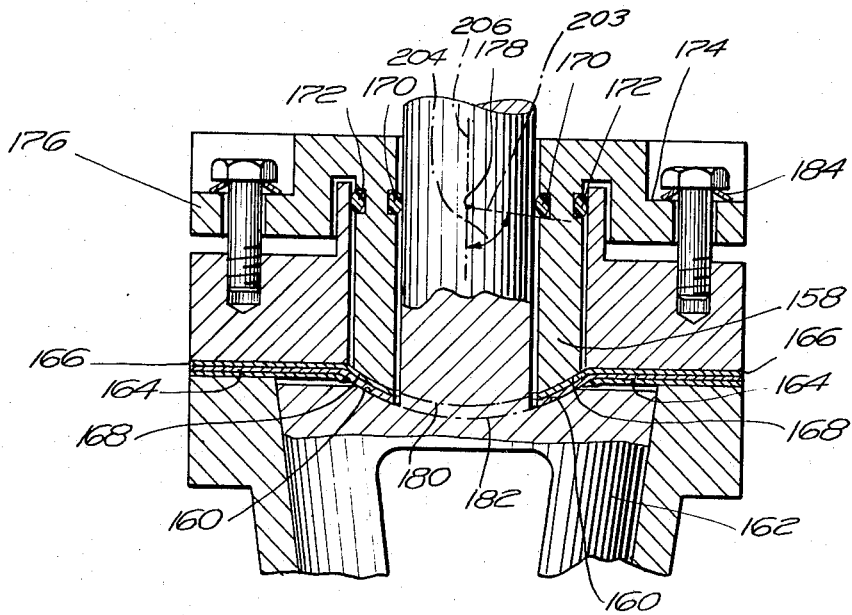
FIGURE 9 is also like FIG. 7 but showing still another embodiment.

FIGURE 9 is an embodiment which shows that only one gland member 158 need be used when a spherical surface 160 is formed on the plug 162 itself. In this arrangement a diaprhragm 164 and gasket 166 are shaped to fit between the spherical plug surface 160 and the corresponding spherical surface 168 on the gland member 158. The O-ring seals 170 and 172 and the surface 174 of the gland member flange 76 are located about on the level with the center 178 of the spherical planes 180 and 182 (for the surfaces 168 and 160), so that the lateral movements of the gland member 158 at this level are negible. As a result friction at the springs 184, and working of the ring seals (which might eventually produce leak) is not significant.

Figure 3:
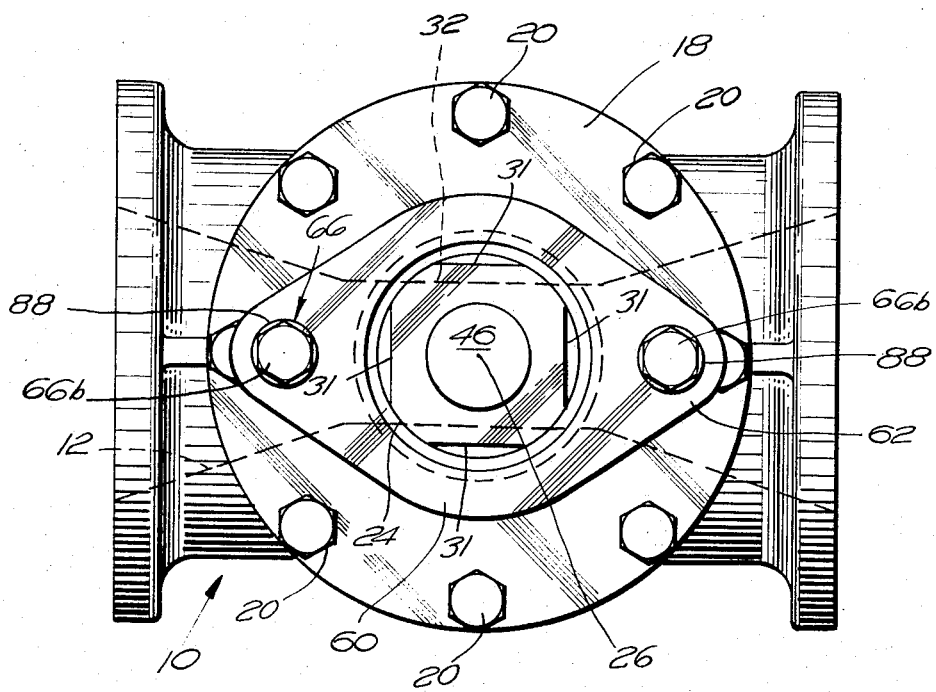
FIGURE 3 is a top plan view of the valve of FIGS. 1 and 2 taken on line 3—3 of FIG. 2.
Figure 10:
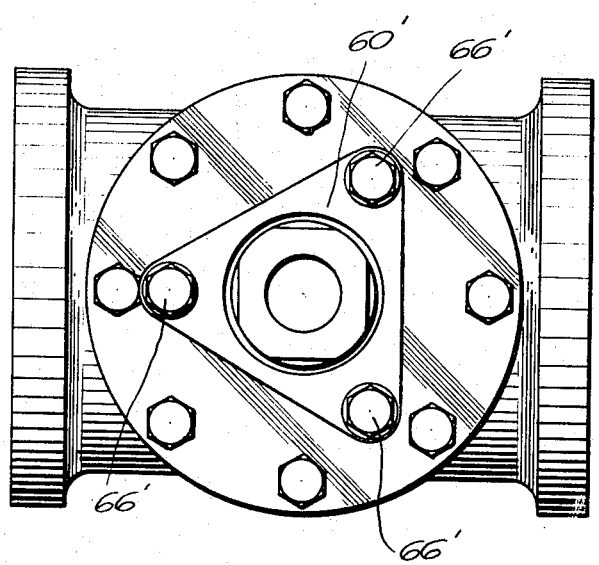
FIGURE 10 is a view like FIG. 3 but showing a gland which is secured to the bonnet by three bolts rather than two.

FIGURE 10 is a view like FIG. 3 but showing that the gland 60' can have more than two bolts, as in FIG. 3. With more than two bolts (FIG. 10 shows three) the gland member surface which backs up the primary seal exerts a substantially uniform reactive force thereon even if one bolt 66' is tightened more than the others.

Figure 11:
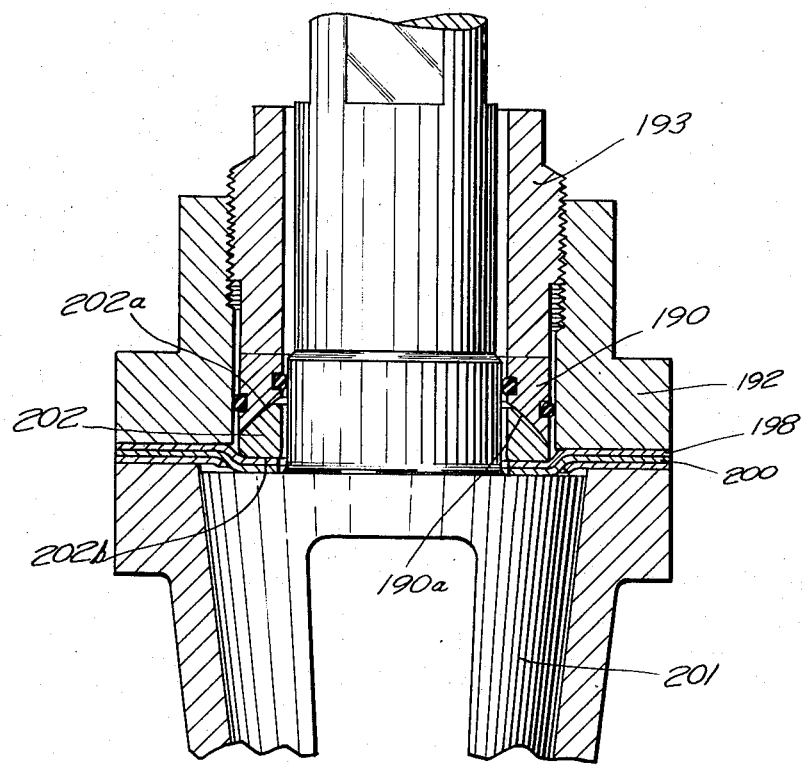
FIGURE 11 is another view like FIGS. 7, 8 and 9, but showing another embodiment in which the gland member is threaded into the cover.

FIGURE 11 shows another embodiment in which the outer gland member 190 is held in place with respect to the cover 192 by a large member 193 threaded into the cover in the manner shown. The present invention is useful in this situation to solve a problem created by machining tolerances. If the nut member 193 directly engaged the gaspret-diaphragm assembly 198, 200 (or engaged a gland member which engaged the gasket-diaphragm assembly) machining errors could easily result in the nut member's backing-up the assembly on one side only, or at least more on one side than on another. Upon rotation of the nut member to thread it farther into the cover or to thread it out of the cover the "high point" would shift around the stem. Line pressure would press the plug 201 up against the gasket-diaphragm assembly 198–200 which in turn would press against the lower end of the nut member 193, and it could well be the case that a tight seal would be achieved only at the "high point," with at least a good chance of leakage elsewhere around stem.

In the FIG. 11 embodiment, however a combination of gland member 190 and ring member 202 is provided, with mating spherical surfaces 190a and 202a which allow the lower ring member surface 202b to remain in firm uniform engagement with the gasket-diaphragm assembly 198, 200 all the way around the stem, even when there are are such "high points" as described.

Figure 2:
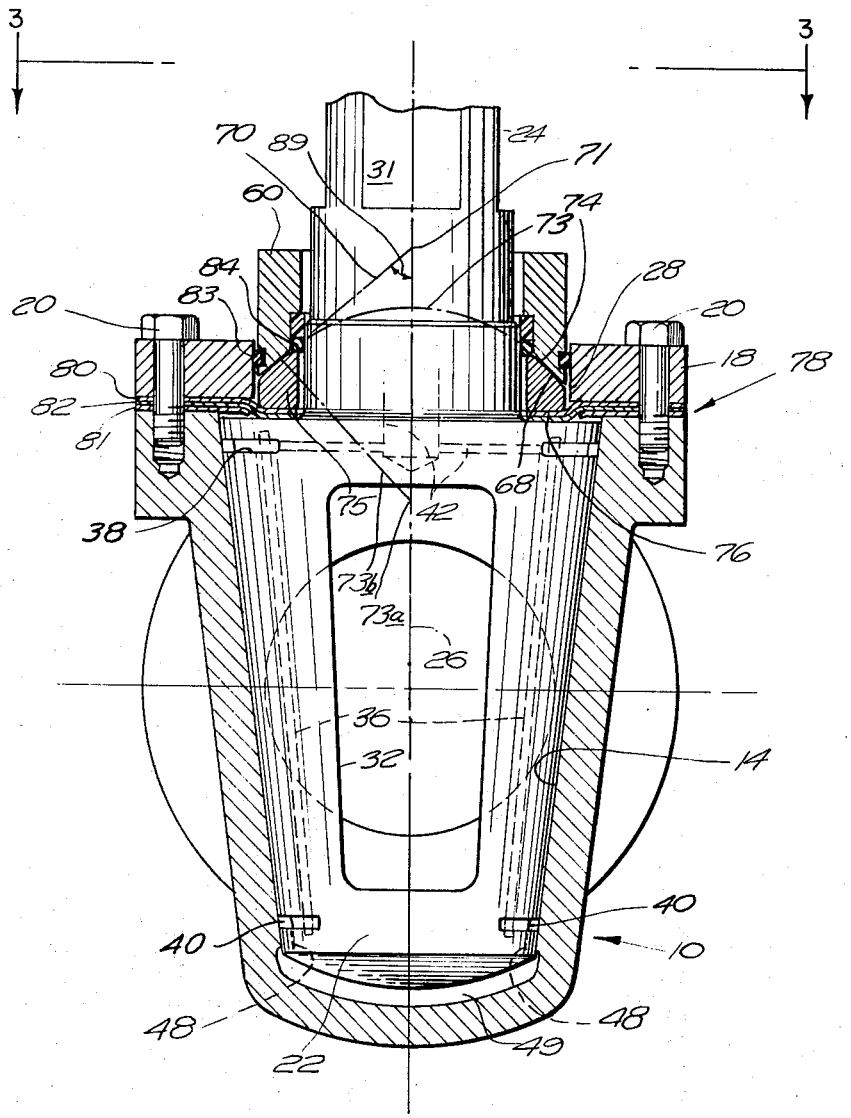
FIGURE 2 is a cross-sectioned side elevation view of the valve of FIG. 1 taken on line 2—2 of FIG. 1.

In FIG. 2 the slope of the cone 70 with respect to the axis 26 is represented by angle 89. It is preferred that this angle be less than 85°. If angle 89 is greater than this, there is too much frictional resistance to lateral movement.

FIG. 9 shows that a line 203 drawn from the sphere center 178 to that part of the O-ring 170 which gives angle 204 (with the axis 206) its smallest value, forms an angle of 83° with this axis. By far the best results, that is, the least working of the O-rings is achieved, when angle 204 is at least 45°.

I claim:
1. A lubricated plug valve comprising:
   (I) a body member which:
      (A) is hollow,
      (B) has end openings,
      (C) has side walls which:
         (1) extend between said end openings,
         (2) define a flow passage,
      (D) has a side opening through one of said side walls,
      (E) has a cavity which:
         (1) originates at said side opening,
         (2) extends into communication with said flow passage,
      (F) has an annular surface surrounding said side opening,
   (II) a plug element which:
      (A) is mounted in said cavity,
      (B) extends across said flow passage,
      (C) has a stem which:
         (1) is connected to one plug element end,
         (2) projects out of said side opening,
      (D) has a surface which:
         (1) is located on said one plug element end,
         (2) is annular,
         (3) surrounds said stem,
         (4) is presented out of said side opening,
   (III) a clamping member which:
      (A) is secured to said body member,
      (B) has an annular surface presented to said annular body member surface,
      (C) has an opening which:
         (1) receives said plug stem,
         (2) communicates with said plug element annular surface,
   (IV) a diaphragm which:
      (A) is annular,
      (B) has an outer portion which:
         (1) is located between said body and clamping member annular surfaces,
         (2) is sealing squeezed by said body and clamping annular surfaces,
      (C) has an inner portion which:
         (1) is integral with said outer portion,
         (2) extends across said plug element annular surface,
   (V) a gland assembly which:
      (A) surrounds said plug stem,
      (B) has at least one portion which:
         (1) is located within said clamping member opening,
         (2) has a surface engaging said inner diaphragm portion to form a primary seal,
      (C) has means secured to one of said body and clamping members for adjusting the position of said gland assembly portion surface toward and away from said plug element,
      (D) has means for maintaining said gland assembly portion surface parallel to said annular plug element surface over a range of adjustments of said adjusting means.

2. A lubricated plug valve according to claim 1 wherein said means for maintaining said gland assembly portion surface parallel to said annular plug element surface comprises at least one ball joint surface.

3. A lubricated plug valve according to claim 2 wherein said ball joint surface coincides with an annular portion of an imaginary sphere.

4. A lubricated plug valve according to claim 3 wherein said plug element is rotatable in said cavity about an axis and wherein the center of said imaginary sphere is substantially on said axis.

5. A lubricated plug valve according to claim 4 wherein said ball joint surface is concentric with respect to said axis and wherein a tangent drawn from said axis to the center of said annular sphere portion forms with said axis a smaller angle substantially less than 90°.

6. A lubricated plug valve according to claim 5 wherein said smaller angle is less than 85°.

7. A lubricated plug valve according to claim 5 wherein said smaller angle is substantially 55°.

8. A lubricated plug valve according to claim 1 wherein said gland assembly comprises at least first and second elements, having annular conical and spherical surfaces, respectively, which engage each other to form a ball joint.

9. A lubricated plug valve according to claim 8 wherein the diaphragm-engaging surface of said one gland assembly portion is on one end said second element and wherein said spherical surface is on the opposite end of said second element.

10. A lubricated plug valve according to claim 9 wherein one secondary seal is located between one of said elements and said stem, and wherein another secondary seal is located between said element and said clamping member opening.

11. A lubricated plug valve according to claim 10 wherein both said secondary seals engage said first gland assembly element.

12. A lubricated plug valve according to claim 10 wherein both said secondary seals engage said second gland assembly element.

13. A lubricated plug valve according to claim 1 wherein said gland assembly comprises first and second elements having annular complementary spherical surfaces which engage eachother to form a ball joint.

14. A lubricated plug valve according to claim 1 wherein said clamping member opening is defined by walls which are substantially cylindrical, wherein said plug stem has walls which are presented toward said clamping member opening walls and which are substantially parallel thereto, and wherein said gland assembly portion has sides which are substantially spaced from said plug stem and clamping member walls, whereby said gland assembly portion can move somewhat within said opening toward and away from said walls.

15. A lubricated plug valve according to claim 14 wherein said gland assembly portion is closer to said clamping member opening walls than to said stem walls when said gland assembly portion is concentrically positioned with respect to both said stem and clamping member opening.

16. A lubricated plug valve according to claim 1 wherein said clamping member has a threaded surface which surrounds said opening therein, wherein said gland assembly comprises a nut member which is threaded on said clamping member surface and which holds said gland assembly portion within said clamping member opening.

17. A lubricated plug valve according to claim 1 wherein said gland assembly comprises at least one element within said clamping member opening, and wherein each said element is rigid.

18. A lubricated plug valve comprising:
(I) a body member which:
(A) is hollow,
(B) has end openings,
(C) has side walls which:
(1) extend between said end openings,
(2) define a flow passage,
(D) has a side opening through one of said side walls,
(E) has a cavity which:
(1) originates at said side opening,
(2) extends into communication with said flow passage,
(F) has an annular surface surrounding said side opening,
(II) a plug element which:
(A) is mounted in said cavity,
(B) extends across said flow passage,
(C) has a stem which:
(1) is connected to one plug element end,
(2) projects out of said side opening,
(D) has a surface which:
(1) is located on said one plug element end,
(2) is annular,
(3) surrounds said stem,
(4) is presented out of said side opening,
(III) a clamping member which:
(A) is secured to said body member,
(B) has an annular surface presented to said annular body member surface,
(C) has an opening which:
(1) receives said plug stem,
(2) communicates with said plug element annular surface,
(IV) a diaphragm which:
(A) is annular,
(B) has an outer portion which:
(1) is located between said body and clamping member annular surfaces,
(2) is sealing squeezed by said body and clamping member annular surfaces,
(C) has an inner portion which:
(1) is integral with said outer portion,
(2) extends across said plug element annular surface,
(V) a gland assembly which:
(A) surrounds said plug stem,
(B) has at least one portion which:
(1) is located within said clamping member opening,
(2) has a surface engaging said inner diaphragm portion to form a primary seal,
(C) has at least two connections, each of which:
(1) is secured to one of said body and clamping members,
(2) is adjacent a different section of said inner diaphragm portion,
(3) is adjustable toward and away from said plug element,
(D) has means for maintaining said gland assembly portion surface parallel to said annular plug element surface over a range of adjustments of said connection.

19. A lubricated plug valve according to claim 18 wherein said gland assembly has first and second elements, one of which has a plurality of openings therethrough surrounded by contact surfaces, wherein each of said gland assembly connections comprises a shaft which has one end secured to one of said body and clamping members, which passes through one of said element openings, and which has a contact surface presented toward the opening contact surface, and wherein a spring is located between and engages said contact surfaces.

20. A lubricated plug valve according to claim 19 wherein each said shaft is a bolt having a head, wherein said shaft contact surface is the underside of said bolt head, and wherein the spring is a spring washer.

21. A lubricated plug valve according to claim 18 wherein said gland assembly has first and second elements, one of which has a plurality of openings therethrough surrounded by contact surfaces, wherein each of said assembly connections comprises a shaft which has one end secured to one of said body and clamping members, which passes through one of said element openings, and which has a contact surface presented toward the opening contact surface, wherein said plug element is rotatable in said cavity about an axis and wherein said spherical surfaces have a center substantially at the intersection of said axis and an imaginary plane containing said element contact surfaces.

22. A lubricated plug valve according to claim 21 wherein secondary seals are located between said one gland assembly element, said stem and said clamping member substantially at said imaginary plane.

23. A lubricated plug valve according to claim 22 wherein an imaginary line drawn from any point on one of said seals to said intersection forms a smaller angle with said axis of at least 45°.

24. A lubricated plug valve according to claim 21 wherein a spring is located between said contact surfaces on said shaft and element.

25. A lubricated plug valve according to claim 24 wherein each shaft is a bolt having a bolthead, wherein said shaft contact surface is the underside of said bolthead and wherein said spring is a spring washer.

References Cited
UNITED STATES PATENTS

| | | | |
|---|---|---|---|
| 2,032,316 | 2/1936 | Cotton | 137—246.19 |
| 2,100,470 | 11/1937 | Cotton | 137—246.15 |
| 2,229,120 | 1/1941 | Nordstrom | 137—246.19 |
| 2,454,389 | 11/1948 | Jacobson | 137—246.19 X |
| 2,540,668 | 2/1951 | Haun | 137—246.19 X |
| 2,744,651 | 5/1956 | Bredtschneider | 220—46 |
| 2,876,987 | 3/1959 | Renfro | 251—214 |
| 3,030,067 | 4/1962 | Manor | 251—214 |
| 3,192,942 | 7/1965 | Manor | 137—246.19 |
| 3,233,921 | 2/1966 | Holmgren | 285—110 |

CLARENCE R. GORDON, *Primary Examiner.*